US012630153B2

(12) United States Patent
Sumer et al.

(10) Patent No.: US 12,630,153 B2
(45) Date of Patent: May 19, 2026

(54) VEHICLE OPERATION AROUND OBSTACLES

(71) Applicant: Ford Global Technologies, LLC, Dearborn, MI (US)

(72) Inventors: Erol Dogan Sumer, Ann Arbor, MI (US); Ehsan Arabi, Farmington Hills, MI (US); Yousaf Rahman, Ypsilanti, MI (US); Abhishek Sharma, Lasalle/Ontario (CA); Alex Maurice Miller, Canton, MI (US); Michael Hafner, San Carlos, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 18/528,860

(22) Filed: Dec. 5, 2023

(65) Prior Publication Data

US 2025/0178597 A1      Jun. 5, 2025

(51) Int. Cl.
 B60W 30/09 (2012.01)
 B60W 10/18 (2012.01)
 (Continued)

(52) U.S. Cl.
 CPC ............ B60W 30/09 (2013.01); B60W 10/18 (2013.01); B60W 10/20 (2013.01); (Continued)

(58) Field of Classification Search
 CPC ...... B60W 30/09; B60W 10/18; B60W 10/20; B60W 30/0956; B60W 2520/105; (Continued)

(56) References Cited

U.S. PATENT DOCUMENTS

| 8,437,890 B2 * | 5/2013 | Anderson | ............ | B60W 30/09 |
| | | | | 701/3 |
| 9,174,672 B2 | 11/2015 | Zeng et al. | | |

(Continued)

FOREIGN PATENT DOCUMENTS

| EP | 2829424 A1 * | 1/2015 | ............ | B60G 17/06 |
| GB | 2505416 A * | 3/2014 | ............ | G06F 30/20 |

OTHER PUBLICATIONS

Yang et al., "Sampling-based Motion Planning via Control Barrier Functions", DOI: https://doi.org/10.1145/3365265.3365282, ICACR 2019, Oct. 11-13, 2019, Prague, Czech Republic.

*Primary Examiner* — Tuan C To
(74) *Attorney, Agent, or Firm* — Frank A. Mackenzie; Brooks Kushman P.C.

(57) ABSTRACT

A computer includes a processor and a memory, and the memory stores instructions executable by the processor to formulate a plurality of constraints, determine a final input modification to a nominal input that minimizes a cost function subject to the constraints, and actuate a component of a vehicle according to the nominal input and the final input modification. Each constraint indicates a respective obstacle relative to the vehicle. Each constraint is represented as a linear inequality in a two-dimensional space with dimensions for acceleration and steering angle. The nominal input includes a nominal acceleration and a nominal steering angle. The final input modification includes a final change to the nominal acceleration and a final change to the nominal steering angle. The computer determines the final input modification by individually calculating the cost function for a plurality of potential input modifications that are on the constraints.

20 Claims, 6 Drawing Sheets

(51) Int. Cl.

| | | |
|---|---|---|
| *B60W 10/20* | (2006.01) | |
| *B60W 30/095* | (2012.01) | |

(52) U.S. Cl.
CPC ... *B60W 30/0956* (2013.01); *B60W 2520/105* (2013.01); *B60W 2540/18* (2013.01)

(58) Field of Classification Search
CPC . B60W 2540/18; G08G 1/163; G08G 1/0965; G08G 1/00; B60T 8/1755; B60L 7/18; B62D 1/00
USPC ......................................................... 701/301
See application file for complete search history.

(56) References Cited

U.S. PATENT DOCUMENTS

| | | | |
|---|---|---|---|
| 10,679,501 B2 | 6/2020 | Caveney et al. | |
| 10,816,977 B2 | 10/2020 | Zhang et al. | |
| 10,816,990 B2 | 10/2020 | Li et al. | |
| 10,885,236 B2 * | 1/2021 | Cheong ................... | G06F 30/17 |
| 11,567,500 B2 | 1/2023 | Wuthishuwong et al. | |
| 2014/0088925 A1 * | 3/2014 | Owen ................ | G03F 7/70504 |
| | | | 703/1 |
| 2020/0050196 A1 * | 2/2020 | Liao-Mcpherson ......................... | |
| | | | G05B 13/048 |
| 2020/0159216 A1 * | 5/2020 | Le ........................ | G05D 1/0214 |
| 2020/0293009 A1 * | 9/2020 | Quirynen ............. | G05B 13/041 |
| 2024/0308506 A1 * | 9/2024 | Quirynen ............. | B60W 30/14 |

* cited by examiner

VEHICLE OPERATION AROUND OBSTACLES

BACKGROUND

Advanced driver assistance systems (ADAS) are electronic technologies that assist drivers in driving and parking functions. Examples of ADAS include forward proximity detection, lane-departure detection, blind-spot detection, braking actuation, adaptive cruise control, and lane-keeping assistance systems.

DETAILED DESCRIPTION

Figure 1:
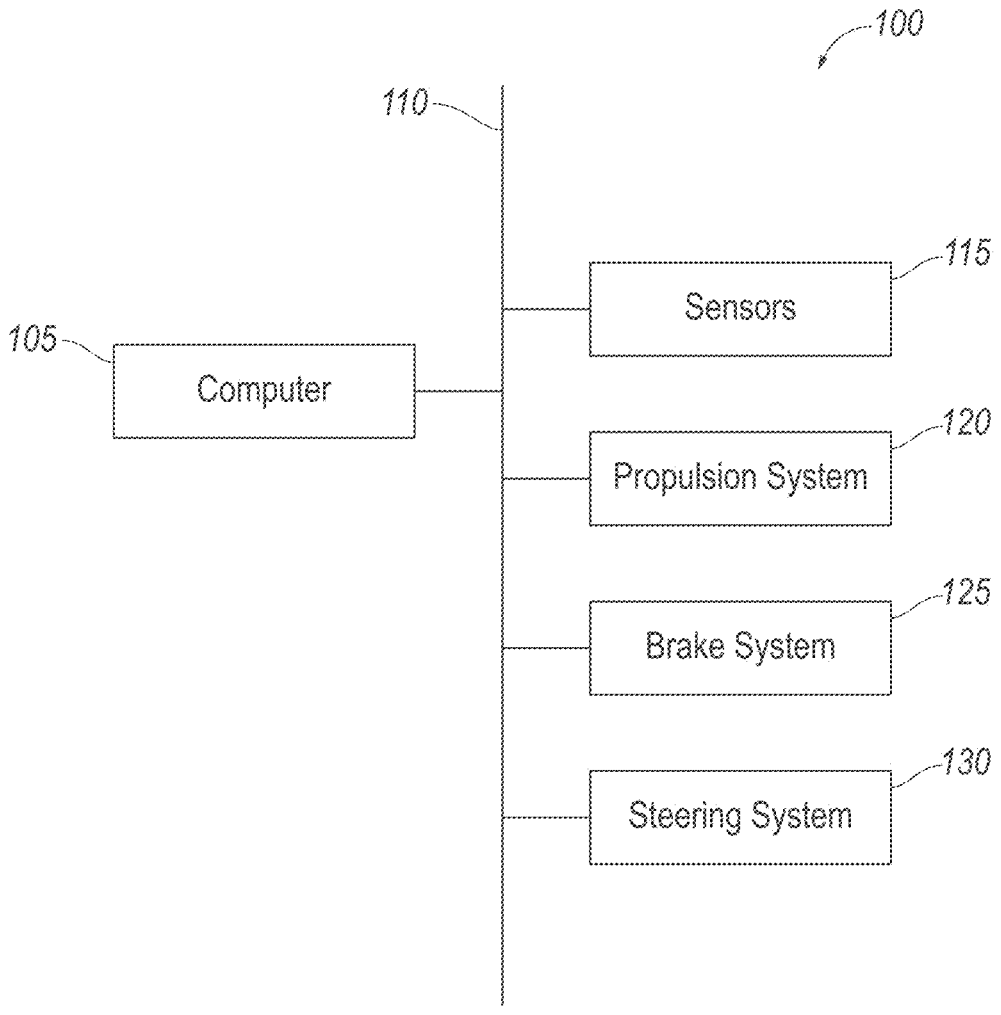
FIG. 1 is a block diagram of an example vehicle.

The techniques described herein may decrease a likelihood of contact between an obstacle and a vehicle by actuating a component of the vehicle, e.g., with autonomous operation or ADAS functions. The component may include a brake system and a steering system, and the computer may actuate the brake system and the steering system according to an input specifying acceleration and steering angle. The computer may receive a nominal input, e.g., from an operator of the vehicle or an autonomous-operation algorithm, and then determine a final input modification based on constraints indicating respective obstacles around the vehicle. Each constraint is represented as a linear inequality in a two-dimensional space with dimensions for acceleration and steering angle. The computer determines the final input modification by minimizing a cost function subject to the constraints, specifically, by individually calculating the cost function for a plurality of potential input modifications that are on the constraints. This technique finds the minimum value of the cost function in a computationally efficient manner. For example, this technique requires significantly less processing time than a standard quadratic programming solver.

A computer includes a processor and a memory, and the memory stores instructions executable by the processor to formulate a plurality of constraints, determine a final input modification to a nominal input that minimizes a cost function subject to the constraints, and actuate a component of a vehicle according to the nominal input and the final input modification. Each constraint indicates a respective obstacle relative to the vehicle. Each constraint is represented as a linear inequality in a two-dimensional space with dimensions for acceleration and steering angle. The nominal input includes a nominal acceleration and a nominal steering angle. The final input modification includes a final change to the nominal acceleration and a final change to the nominal steering angle. The computer determines the final input modification by individually calculating the cost function for a plurality of potential input modifications that are on the constraints.

modification by individually calculating the cost function for a plurality of potential input modifications that are on the constraints.

In an example, the instructions may further include instructions to actuate a brake system of the vehicle according to a sum of the nominal acceleration and the final change to the nominal acceleration.

In an example, the instructions may further include instructions to actuate a steering system of the vehicle according to a sum of the nominal steering angle and the final change to the nominal steering angle.

In an example, the instructions may further include instructions to select at least one intersection point between two of the constraints in the two-dimensional space as one of the potential input modifications for individually calculating the cost function.

In an example, the instructions may further include instructions to select at least one minimal-cost point having a lowest value of the cost function along one of the constraints in the two-dimensional space as one of the potential input modifications for individually calculating the cost function. In a further example, the instructions to select the at least one minimal-cost point may include instructions to solve a closed-form expression for the at least one minimal-cost point.

In an example, the instructions may further include instructions to sequentially calculate the cost function for the potential input modifications in a rule-based order.

In an example, the cost function may be quadratic. In a further example, the cost function may lack a linear term.

In an example, the instructions may further include instructions to determine that none of the constraints are constraining the final input modification and, upon determining that none of the constraints are constraining the final input modification, select zero as the final change to the nominal acceleration and zero as the final change to the nominal steering angle.

In an example, at least one of the constraints may be based on a control barrier function. In a further example, the at least one of the constraints may be equivalent to a sum of a change with respect to time of the control barrier function and a function of the control barrier function exceeding a value.

In an example, the cost function may increase with increasing change to the nominal acceleration.

In an example, the cost function may increase with increasing change to the nominal steering angle.

In an example, the constraints may be first constraints, minimizing the cost function may be subject to a second constraint, and the second constraint may be that a sum of the nominal acceleration and the final change to the nominal acceleration is within a preset value.

In an example, the constraints may be first constraints, minimizing the cost function may be subject to a second constraint, and the second constraint may be that a sum of the nominal steering angle and the final change to the nominal steering angle is within a preset value.

In an example, the nominal input may include at least one of a value inputted by an operator or a value outputted by an algorithm for at least partially autonomously operating the vehicle.

A method includes formulating a plurality of constraints, determining a final input modification to a nominal input that minimizes a cost function subject to the constraints, and actuating a component of a vehicle according to the nominal input and the final input modification. Each constraint indicates a respective obstacle relative to the vehicle. Each constraint is represented as a linear inequality in a two-dimensional space with dimensions for acceleration and steering angle. The nominal input includes a nominal acceleration and a nominal steering angle. The final input modification includes a final change to the nominal acceleration and a final change to the nominal steering angle. The computer determines the final input modification by individually calculating the cost function for a plurality of potential input modifications that are on the constraints.

In an example, the method may further include actuating a brake system of the vehicle according to a sum of the nominal acceleration and the final change to the nominal acceleration and actuating a steering system of the vehicle according to a sum of the nominal steering angle and the final change to the nominal steering angle.

In an example, the method may further include sequentially calculating the cost function for the potential input modifications in a rule-based order.

With reference to the Figures, wherein like numerals indicate like parts throughout the several views, a computer 105 includes a processor and a memory, and the memory stores instructions executable by the processor to formulate a plurality of first constraints 305, determine a final input modification to a nominal input that minimizes a cost function subject to the first constraints 305, and actuate a component of a vehicle 100 according to the nominal input and the final input modification. Each first constraint 305 indicates a respective obstacle 205 relative to the vehicle 100. Each first constraint 305 is represented as a linear inequality in a two-dimensional space 300 with dimensions for acceleration and steering angle. The nominal input includes a nominal acceleration and a nominal steering angle. The final input modification includes a final change to the nominal acceleration and a final change to the nominal steering angle. The computer 105 determines the final input modification by individually calculating the cost function for a plurality of potential input modifications that are on the first constraints 305.

With reference to FIG. 1, the vehicle 100 may be any passenger or commercial automobile such as a car, a truck, a sport utility vehicle, a crossover, a van, a minivan, a taxi, a bus, etc. The vehicle 100 may include the computer 105, a communications network 110, sensors 115, a propulsion system 120, a brake system 125, and a steering system 130.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 110. The communications network 110 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the sensors 115, the propulsion system 120, the brake system 125, the steering system 130, and other components via the communications network 110.

The sensors 115 may provide data about operation of the vehicle 100, for example, wheel speed, wheel orientation, and engine and transmission data (e.g., temperature, fuel consumption, etc.). The sensors 115 may detect the location and/or orientation of the vehicle 100. For example, the sensors 115 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 115 may detect the external world, e.g., objects and/or characteristics of surroundings of the vehicle 100, such as other vehicles, road lane markings, traffic lights and/or signs, road users, etc. For example, the sensors 115 may include radar sensors, ultrasonic sensors, scanning laser range finders, light detection and ranging (lidar) devices, and image processing sensors such as cameras.

In particular, the sensors 115 include at least one range sensor. A range sensor returns range data indicating distances to objects in the environment by emitting signals or pulses and measuring a time for the signals or pulses to reflect off of objects back to the range sensor. The range sensor(s) may include radar(s), lidar(s), ultrasonic sensor(s), etc. A radar transmits radio waves and receives reflections of those radio waves to detect physical objects in the environment. The radar can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves. A lidar device detects distances to objects by emitting laser pulses at a particular wavelength and measuring the time of flight for the pulse to travel to the object and back. The lidar device can be any suitable type for providing the lidar data on which the computer 105 can act, e.g., spindle-type lidar, solid-state lidar, flash lidar, etc. An ultrasonic sensor measures distances to features of the environment by emitting ultrasonic sound waves and converting the reflected sound into an electrical signal.

The range data may be, e.g., a point cloud. The points of the point cloud specify respective positions in the environment relative to the position of the range sensor in two- or three-dimensional space. For example, the range data can be in spherical coordinates with the range sensor at the origin of the spherical coordinate system. The spherical coordinates can include a radial distance, i.e., a measured depth from the range sensor to the point measured by the range sensor; a polar angle, i.e., an angle from a vertical axis through the range sensor to the point measured by the range sensor; and an azimuthal angle, i.e., an angle in a horizontal plane from a horizontal axis through the range sensor to the point measured by the range sensor. The horizontal axis can be, e.g., along a vehicle-forward direction. Alternatively, the range sensor can return the points as Cartesian coordinates with the range sensor at the origin or as coordinates in any other suitable coordinate system, or the computer 105 can convert the spherical coordinates to Cartesian coordinates or another coordinate system after receiving the range data.

The description below describes spatial relationships and kinematics using two horizontal dimensions.

The propulsion system 120 of the vehicle 100 generates energy and translates the energy into motion of the vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the vehicle 100 to thereby slow and/or stop the vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, e.g., a steering wheel.

Figure 2:
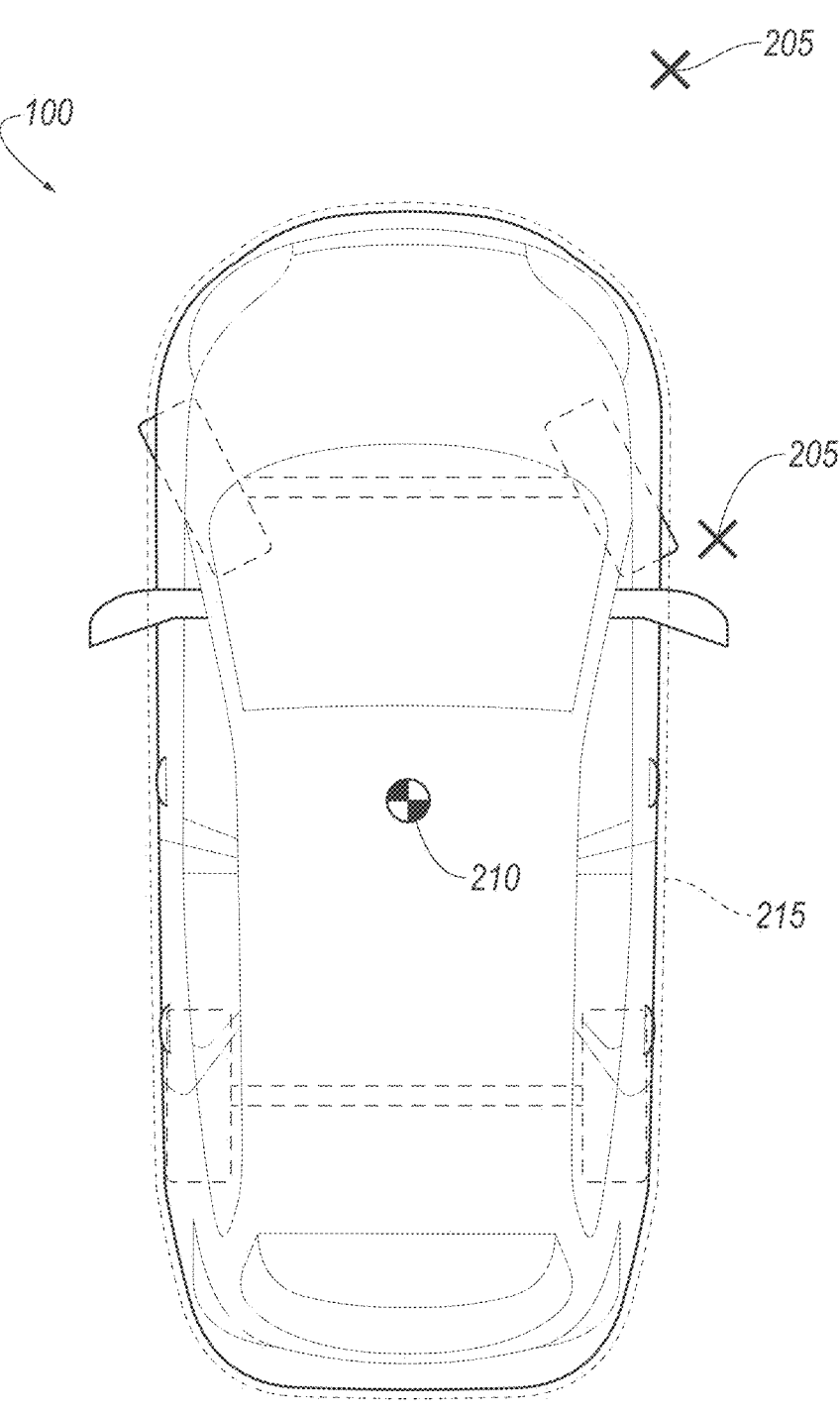
FIG. 2 is a diagrammatic top view of the vehicle with example obstacles.

With reference to FIG. 2, the computer 105 is programmed to determine a vehicle kinematic state of the vehicle 100. For the purposes of this disclosure, a "kinematic state" is defined as a mathematical description of the position and/or motion of an entity. For example, the vehicle kinematic state can include a position, a heading, a velocity vector, and a yaw rate. The position of the vehicle 100 can be the position of a predefined point 210 of the vehicle 100, e.g., the center of gravity or the center of a rear axle. The components of the velocity vector of the vehicle 100 can be given by the following equations:

$$\dot{x}_H = v_H \cos \theta_H$$

$$\dot{y}_H = v_H \sin \theta_H$$

in which $(x_H, y_H)$ is the position of the vehicle 100, the dot above a variable indicates a time derivative, $v_H$ is the longitudinal velocity, i.e., speed, of the vehicle 100, and $\theta_H$ is the heading of the vehicle 100. The yaw rate of the vehicle 100 can be given by the following equation:

$$\dot{\theta}_H = \omega_H = \frac{v_H \tan \delta}{W}$$

in which $\delta$ is the steering angle of the vehicle 100 and W is the wheelbase of the vehicle 100, i.e., the longitudinal distance between a front axle and the rear axle.

The computer 105 can be programmed to determine the vehicle kinematic state based on sensor data from the sensors 115. For example, the sensors 115 can return the position from a GPS sensor, the speed $v_H$ of the vehicle 100 from wheel speed sensors, the heading $\theta_H$ of the vehicle 100 from an IMU, and the steering angle $\delta$ from the steering system 130.

The computer 105 is programmed to actuate a component of the vehicle 100 according to an input. For the purposes of this disclosure, an "input" is one or more values that control operation of a component of the vehicle 100. The component may include the brake system 125 and the steering system 130. The component may further include the propulsion system 120 in addition to the brake system 125. The input includes acceleration $u_{dec} = -\dot{v}_H$ and steering angle $u_{steer}$. The input u may be represented as a vector of length 2, e.g., $$u = \begin{bmatrix} u_{dec} \\ u_{steer} \end{bmatrix}$$

Actuating the brake system 125 according to the input of the acceleration $u_{dec}$ of the vehicle 100 can include engaging the brake system 125 so that the acceleration an of the vehicle 100 matches the acceleration $u_{dec}$ specified in the input. Actuating the steering system 130 according to the input of the steering angle $u_{steer}$ can include turning the wheels until the wheels are oriented at the steering angle $u_{steer}$, i.e., until the steering angle $\delta$ of the vehicle 100 matches the steering angle $u_{steer}$ specified in the input.

The computer 105 can be programmed to receive a nominal input. The nominal input can be a current value of the input. The nominal input includes a nominal acceleration and a nominal steering angle. The nominal input may include one or more values inputted by an operator. For example, if an operator is manually operating the vehicle 100, the nominal input can be the current values of the values forming the input, e.g., current values of the acceleration $a_H$ of the vehicle 100 and/or the steering angle $\delta$. For another example, if the computer 105 is operating the vehicle 100 at least partially autonomously, the nominal input may include one or more values outputted by an algorithm for the at least partially autonomous operation of the vehicle 100. For example, the algorithm may be for full autonomous operation or for an ADAS feature. The computer 105 can receive the nominal input from the algorithm. The computer 105 may receive the nominal input from both the operator and the algorithm, e.g., the steering angle $\delta$ from the operator and the acceleration $a_H$ from an ADAS feature such as adaptive cruise control, or vice versa. In the absence of an input modification or when the final input modification is zero (determined as will be described below), the computer 105 is programmed to actuate the components of the vehicle 100 according to the nominal input.

The computer 105 can be programmed to receive sensor data from the sensors 115 indicating one or more obstacles 205, e.g., the range data from the at least one range sensor of the sensors 115. For example, FIG. 2 shows two obstacles 205. The sensor data can include positions, headings, velocity vectors, and/or contours of the obstacles 205. The sensor data can thereby define an obstacle kinematic state. For example, the position of the obstacle 205 can be represented as a distance $r_{Hi}$ relative to the vehicle 100, e.g., from the predefined point 210 of the vehicle 100 to the obstacle 205, and a direction $\theta_{Hi}$ relative to the vehicle 100, e.g., from the predefined point 210 of the vehicle 100 to the obstacle 205 measured relative to a longitudinal axis of the vehicle 100, in which the subscript i is an index of the obstacles 205. The velocity vector can be represented by a speed $v_i$ of the obstacle 205 and a heading $\theta_i$ of the obstacle 205.

The computer 105 may be programmed to formulate a control barrier function $h_i$ for each obstacle 205 with respect to the vehicle 100 based on the sensor data, i.e., based on the obstacle 205. Each control barrier function h; may be a difference between the distance $r_{Hi}$ from the predefined point 210 of the vehicle 100 to the respective obstacle 205 and a point on a virtual boundary 215 in the direction $\theta_{Hi}$ from the predefined point 210 of the vehicle 100 to the obstacle 205. The virtual boundary 215 can be represented as a function $\Gamma_H$ of the direction $\theta_{Hi}$ that returns a distance from the predefined point 210 of the vehicle 100 in the direction $\theta_{Hi}$ to the virtual boundary 215. Each control barrier function $h_i$ can be a function of the vehicle kinematic state and the respective obstacle kinematic state. For example, the control barrier function $h_i$ can be represented by the following equation:

$$h_i(r_H, \theta_H, \theta_{Hi}, \theta_i, v_H, v_i) = r_{Hi} - \Gamma_H(\theta_{Hi})$$

The virtual boundary 215 may extend around a footprint of the vehicle 100. For example, the virtual boundary 215 may follow an outer edge of the footprint of a body of the vehicle 100, or the virtual boundary 215 may be spaced by a buffer distance from the footprint of the vehicle 100 outside the footprint of the vehicle 100.

Figure 3:
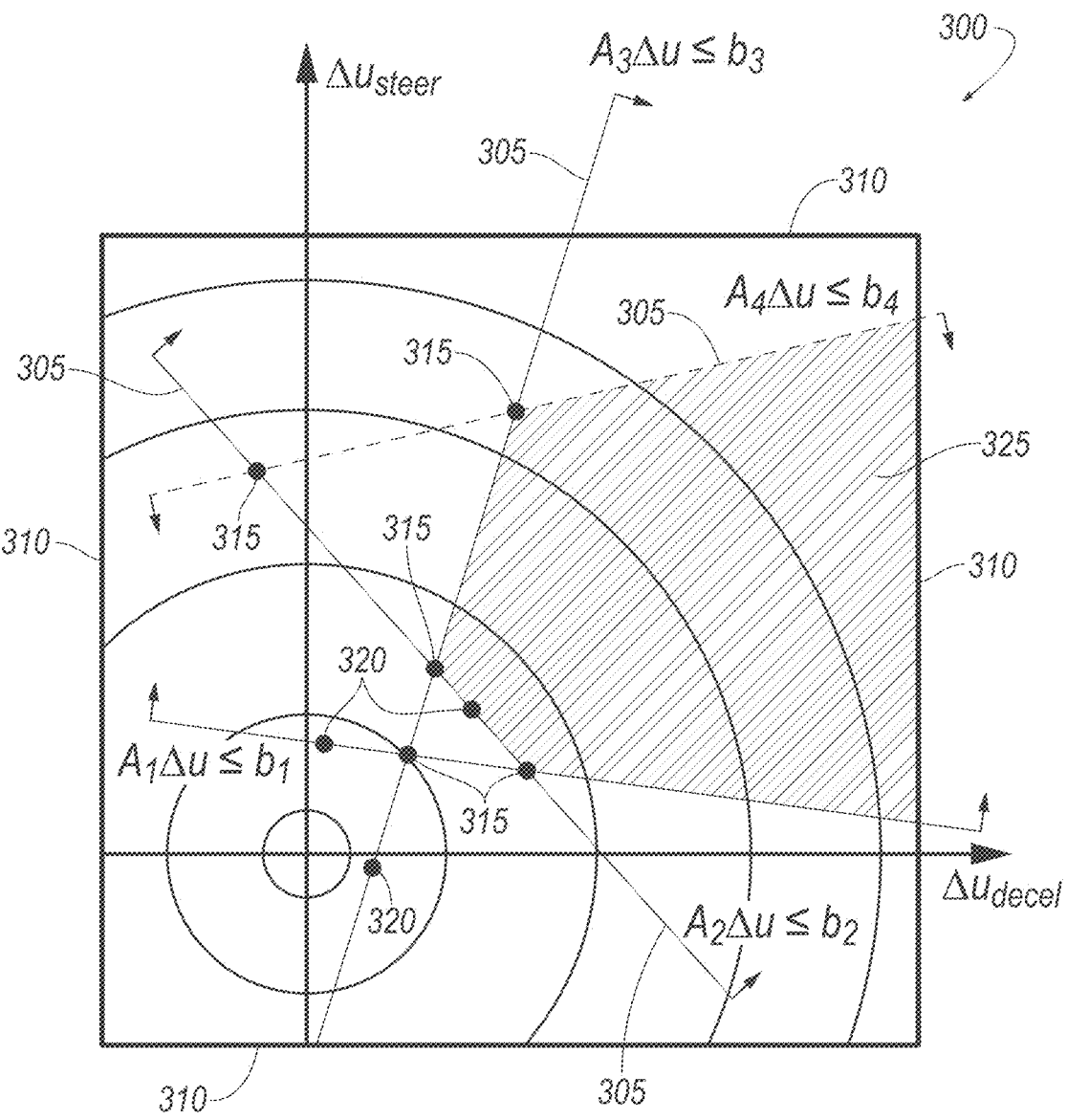
FIG. 3 is a plot of constraints on a modification of a nominal input to the vehicle in a two-dimensional space with dimensions for acceleration and steering angle.

With reference to FIG. 3, the computer 105 may be programmed to determine a final input modification $\Delta u$, as will be described in detail below. The final input modification includes a final change to the nominal acceleration $\Delta u_{dec}$ and a final change to the nominal steering angle $\Delta u_{steer}$. The computer 105 actuates the component, e.g., the brake system 125 and the steering system 130, according to a control input u equal to the nominal input $u_{nom}$ changed by the final input modification $\Delta u$, e.g., a control input u equal to the sum of the nominal input $u_{nom}$ and the final input modification $\Delta u$, i.e., $u = u_{nom} + \Delta u$.

The determination of the final input modification depends on a cost function J. The cost function J is chosen to represent a discomfort or inconvenience to occupants of the vehicle 100 by assigning a higher cost to greater deviations from the nominal input $u_{nom}$. Accordingly, the cost function J increases with increasing change to the nominal acceleration $u_{dec,nom}$, and the cost function J increases with increasing change to the nominal steering angle $u_{steer,nom}$. The cost function may be quadratic, and the cost function may lack a linear term. In other words, the cost function includes a term with an independent variable of power 2 (or two independent variables of power 1 multiplied together) and does not include a term with a single independent variable of power 1. This form for the cost function is what permits the techniques below to find the input modification that minimizes the cost function. For example, the cost function may be given by the following expression:

$$J = \frac{1}{2}(\Delta u)^T H(\Delta u)$$

in which the superscript T indicates the transpose of a matrix and H is a 2×2 matrix specifying a relative cost between deceleration and steering. The matrix H may serve to make the acceleration and steering angle commensurable. The matrix H may have constant terms. The output of the cost function J is a scalar value.

The computer 105 is programmed to determine the final input modification by minimizing the cost function J. As a general overview, the computer 105 formulates a plurality of first constraints 305 and second constraints 310. The first constraints 305 indicate respective obstacles 205 relative to the vehicle 100. The first constraints 305 are represented as linear inequalities in the two-dimensional space 300, which has dimensions for acceleration and steering angle. The second constraints 310 represent the physical capacities of the brake system 125 and steering system 130. Then the computer 105 individually calculates the cost function for a plurality of potential input modifications that are on the constraints 305, 310. The potential input modifications are either intersection points 315 between two constraints 305, 310 or minimal-cost points 320 having a lowest value of the cost function along one of the constraints 305, 310. The computer 105 sequentially calculates the cost function for the intersection points 315 and minimal-cost points 320 in a rule-based order. The rule-based order may be chosen so that the computer 105 can calculate the cost function for fewer than all the intersection points 315 and minimal-cost points 320.

The computer 105 is programmed to formulate the first constraints 305, e.g., a first constraint 305 for each obstacle 205. The computer 105 may downselect the obstacles 205 and formulate a first constraint 305 for each remaining obstacle 205. The first constraints 305 may be based on the respective control barrier functions $h_i$ for the respective obstacles 205. Each first constraint 305 may be equivalent to a sum of a change with respect to time of the control barrier function $h_i$ and a function $\alpha(\cdot)$ of the control barrier function $h_i$ exceeding a value, e.g., as in the following expression:

$$\dot{h}_i + \alpha(h_i) \geq 0$$

The function $\alpha(\cdot)$ can be locally Lipschitz continuous; i.e., within a range of the function $\alpha(\cdot)$ that is implicated by the first constraint 305, the absolute value of the slope between any two points is not greater than a predefined real number. In other words, there is a maximum rate of change of the function $\alpha(\cdot)$ with respect to the control barrier function $h_i$. The function $\alpha(\cdot)$ can be a class K function, i.e., is strictly increasing and is equal to zero when the argument is zero, i.e., $\alpha(0)=0$. The function $\alpha(\cdot)$ can be chosen to cause the component of the vehicle 100 to actuate in time to prevent the vehicle 100 from contacting the obstacle 205. An equivalent form for the first constraint 305 for the ith obstacle 205 is the following expression:

$$-L_g h_i \Delta u \leq L_g h_i u_{nom} + L_f h_i + \alpha(h_i)$$

in which $L_g$ and $L_f$ are partial derivatives of $h_i$ with respect to different components of the kinematic states.

To facilitate the techniques below, each first constraint 305 is represented as a linear inequality in the two-dimensional space 300. In FIG. 3, the first constraints 305 are represented by straight lines with arrows pointing in the direction of the region of the two-dimensional space 300 encompassed by the inequality. For each first constraint 305, the form above may be rearranged and terms may be consolidated such that the first constraint 305 is that a product of a first constant row vector and the input modification is less than or equal to a second constant scalar, i.e., as in the following expression:

$$A_i \Delta u \le b_i$$

in which i is the index of the obstacle 205, A is the first constant row vector with size 1×2, and b is the second constant scalar.

The computer 105 is programmed to formulate the second constraints 310. Each second constraint 310 may represent an upper or lower boundary for the acceleration or steering angle, sometimes referred to as a saturation limit. The second constraint 310 may be chosen based on physical characteristics of the brake system 125 or steering system 130. One set of the second constraints 310 is that a sum of the nominal acceleration and the final change to the nominal acceleration is within upper and lower preset values, e.g., as in the following expressions:

$$u_{dec,nom} + \Delta u_{dec} \le u_{dec,max}$$

$$u_{dec,nom} + \Delta u_{dec} \ge u_{dec,min}$$

in which $u_{dec,max}$ is the upper limit for acceleration and $u_{dec,min}$ is the lower limit for acceleration. Another set of the second constraints 310 is that a sum of the nominal steering angle and the final change to the nominal steering angle is within upper and lower preset values, e.g., as in the following expressions:

$$u_{steer,nom} + \Delta u_{steer} \le u_{steer,max}$$

$$u_{steer,nom} + \Delta u_{steer} \ge u_{steer,min}$$

in which $u_{steer,max}$ is the upper limit for steering angle and $u_{steer,min}$ is the lower limit for steering angle.

The computer 105 may be programmed to determine whether one of the constraints 305, 310 is constraining the final input modification, i.e., moving the value of the final input modification away from a point that would be a global minimum in the absence of the constraints 305, 310. Because of the form of the cost function J, the global minimum in the absence of the constraints 305, 310 is $\Delta u=[0, 0]^T$, i.e., no change to the nominal input $u_{nom}$. The computer 105 may determine that the first constraint 305 for the ith obstacle 205 constrains the final input modification in response to the second constant scalar for that first constraint 305 being less than zero, i.e., $b_i<0$.

The computer 105 may be programmed to determine that none of the first constraints 305 are constraining the final input modification, i.e., that the second constants for all the first constraints 305 are equal to or greater than zero, i.e., $b_i \ge 0$ for all i. The computer 105 may, upon determining that none of the first constraints 305 are constraining the final input modification, select zero as the final change to the nominal acceleration and zero as the final change to the nominal steering angle, i.e., $\Delta u=[0, 0]^T$.

The potential input modifications include the intersection points 315. An intersection point 315 is a point in the two-dimensional space 300 at which two of the constraints 305, 310 cross each other. The computer 105 may select at least one of the intersection points 315 as one of the potential input modifications for individually calculating the cost function. For example, the computer 105 may select an intersection point 315 between two constraints 305, 310, at least one of which is constraining the final input modification. If neither of two constraints 305, 310 is constraining the final input modification, then the intersection point 315 between those two constraints 305, 310 may be excluded, and the cost function for that intersection point 315 not calculated.

The computer 105 may be programmed to calculate the cost function for an intersection point 315 between two constraints 305, 310. First, the computer 105 calculates the coordinates for the intersection point 315, i.e., determines $\Delta u$ that is on both constraints 305, 310. For example, the computer 105 may solve a linear system of equations, the system of equations being the equalities for the two constraints 305, 310, e.g., as in the following expression:

$$A_i \Delta u = b_i$$

$$A_j \Delta u = b_j$$

in which the indexes i and j track the constraints 305, 310. The computer 105 may use linear algebraic techniques as are known. Second, the computer 105 may calculate the cost function using the formula above for the cost function J with the determined coordinates $\Delta u$ substituted in.

The potential input modifications include the minimal-cost points 320. A minimal-cost point 320 is the point in the two-dimensional space 300 having a lowest value of the cost function along one of the constraints 305, 310. The computer 105 may select at least one of the minimal-cost points 320 as one of the potential input modifications for individually calculating the cost function. For example, the computer 105 may select a minimal-cost point 320 on a constraint 305, 310 that is constraining the final input modification. If a constraint 305, 310 is not constraining the final input modification, then the minimal-cost point 320 on that constraint may be excluded, and the cost function for that minimal-cost point 320 not calculated.

The computer 105 may be programmed to calculate the cost function for a minimal-cost point 320. First, the computer 105 calculates the coordinates for the minimal-cost point 320, i.e., determines $\Delta u$ on that constraint 305, 310 that will have the lowest value for the cost function. For example, the computer 105 may solve a closed-form expression for the minimal-cost point 320. For a first constraint 305, the closed-form expression may be formed by substituting the formula for the first constraint 305, i.e., $A_i \Delta u = b_i$, into the formula for the cost function J and solving for the coordinates for $\Delta u$ that sets the gradient along the first constraint 305 to zero. The closed-form expression may be chosen from a set of closed-form expressions depending on the values of the first constant row vector A (to prevent division by zero), e.g., as in the following expressions:

$$\Delta u_{dec} = \frac{H_2 b_i a_{dec}}{H_1 a_{steer}^2 + H_2 a_{dec}^2},$$

-continued $$\Delta u_{steer} = b_i - \frac{a_{dec}}{a_{steer}} \Delta u_{dec}, \text{ for } a_{steer} \neq 0$$

$$\Delta u_{steer} = \frac{H_1 b_i a_{steer}}{H_1 a_{steer}^2 + H_2 a_{dec}^2},$$

$$\Delta u_{dec} = b_i - \frac{a_{steer}}{a_{dec}} \Delta u_{steer}, \text{ for } a_{steer} = 0, a_{dec} \neq 0$$

in which $A_i = [a_{dec}, a_{steer}]$ and $H = \text{diag}([H_1 \ H_2])$.

The computer 105 may be programmed to determine the gradient of the cost function at a point on a constraint 305, 310, e.g., at an intersection point 315 or a minimal-cost point 320. The gradient of a point is a vector oriented in the direction of greatest increase of the cost function with magnitude equal to the rate of increase of the cost function. The gradient has two terms given by the partial derivative with respect to the change to the acceleration $\Delta u_{dec}$ and the partial derivative with respect to the change to the steering angle $\Delta u_{steer}$, respectively.

The computer 105 may be programmed to determine a feasibility of a point $\Delta u$ in the two-dimensional space 300 as the final input modification. A point is feasible if the point satisfies all the constraints 305, 310. FIG. 3 shows a feasible region 325 containing the points that satisfy all the constraints 305, 310. The feasible region 325 includes the points that are on the boundary of the region defined by the constraints 305, 310. The computer 105 may determine whether a point $\Delta u$ is feasible by substituting the point $\Delta u$ into each constraint 305, 310 and determining whether the resulting inequality is true. The computer 105 may substitute the point into the constraints 305, 310 that are constraining the final input modification until one of the constraints 305, 310 is not satisfied, meaning that the point is infeasible, or until all the constraining constraints 305, 310 are satisfied, meaning that the point is feasible.

The computer 105 is programmed to individually calculate the cost function for a plurality of potential input modifications that are on the constraints 305, 310, e.g., the intersection points 315 and the minimal-cost points 320. The computer 105 may refrain from testing points other than the intersection points 315 and the minimal-cost points 320, resulting in low computational effort while still arriving at the feasible point with the minimal value for the cost function. The computer 105 may sequentially calculate the cost function for the potential input modifications in a rule-based order. The rule-based order may specify which potential input modification is first substituted into the cost function, which potential input modification is next substituted into the cost function at each iteration, and an ending condition for stopping the calculations. The computer 105 may then output the potential input modification having the lowest cost for the cost function of the individual calculations. The ending condition may reduce the number of calculations by obviating the need to calculate the cost function for, e.g., all the intersection points 315 and minimal-cost points 320. Two specific examples of rule-based orders are described below with respect to FIGS. 5 and 6.

Figure 4:
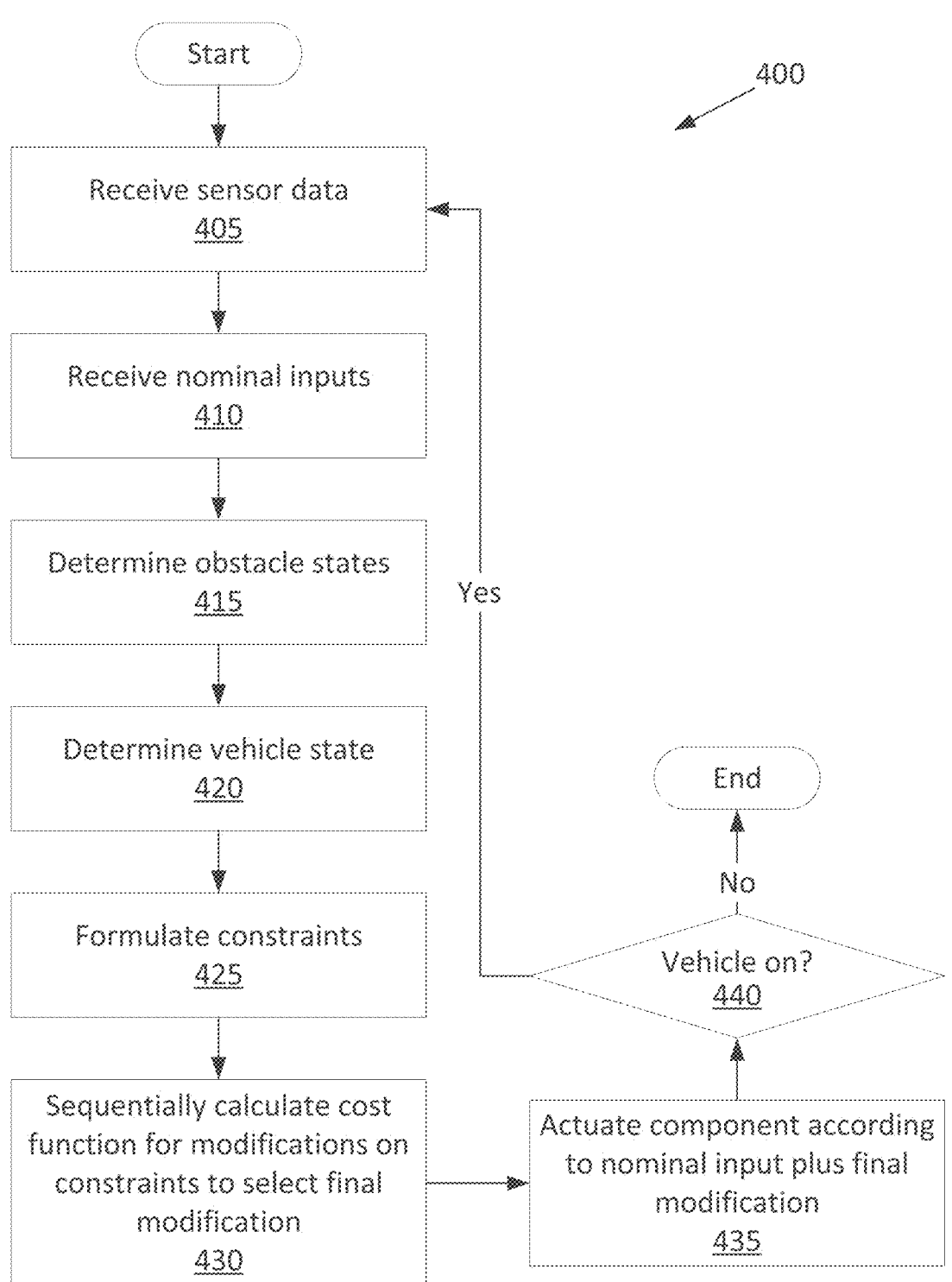
FIG. 4 is a flowchart of an example process for controlling the vehicle with the modification to the nominal input.

FIG. 4 is a flowchart illustrating an example process 400 for controlling the vehicle 100 with the final input modification to the nominal input. The memory of the computer 105 stores executable instructions for performing the steps of the process 400 and/or programming can be implemented in structures such as mentioned above. As a general overview of the process 400, the computer 105 receives data from the sensors 115, receives the nominal input, determines the kinematic states of the obstacles 205, determines the kinematic state of the vehicle 100, formulates the first constraints 305 based on the kinematic states, sequentially calculates the cost function for a plurality of potential input modifications, and actuates a component of the vehicle 100 according to the nominal input and the final input modification. The process 400 proceeds for as long as the vehicle 100 remains on.

The process 400 begins in a block 405, in which the computer 105 receives data from the sensors 115 indicating the obstacles 205, as described above.

Next, in a block 410, the computer 105 receives the nominal input $u_{nom}$, as described above.

Next, in a block 415, the computer 105 determines the obstacle kinematic states for the obstacles 205, as described above.

Next, in a block 420, the computer 105 determines the vehicle kinematic state for the vehicle 100, as described above.

Next, in a block 425, the computer 105 formulates the first constraints 305 based on the control barrier functions for the respective obstacles 205, as described above.

Next, in a block 430, the computer 105 sequentially calculates the cost function for a plurality of the potential input modifications, e.g., for a plurality of the intersection points 315 and minimal-cost points 320, according to the rule-based order, as described above. For example, the rule-based order may be defined according to a process 500 or a process 600, as described below.

Next, in a block 435, the computer 105 actuates the component of the vehicle 100, e.g., the brake system 125 and the steering system 130, according to the nominal input and the final input modification, as described above.

Next, in a decision block 440, the computer 105 determines whether the vehicle 100 is on. In response to the vehicle 100 still being on, the process 400 returns to the block 405 to receive updated data from the sensors 115. In response to the vehicle 100 turning off, the process 400 ends.

Figure 5:
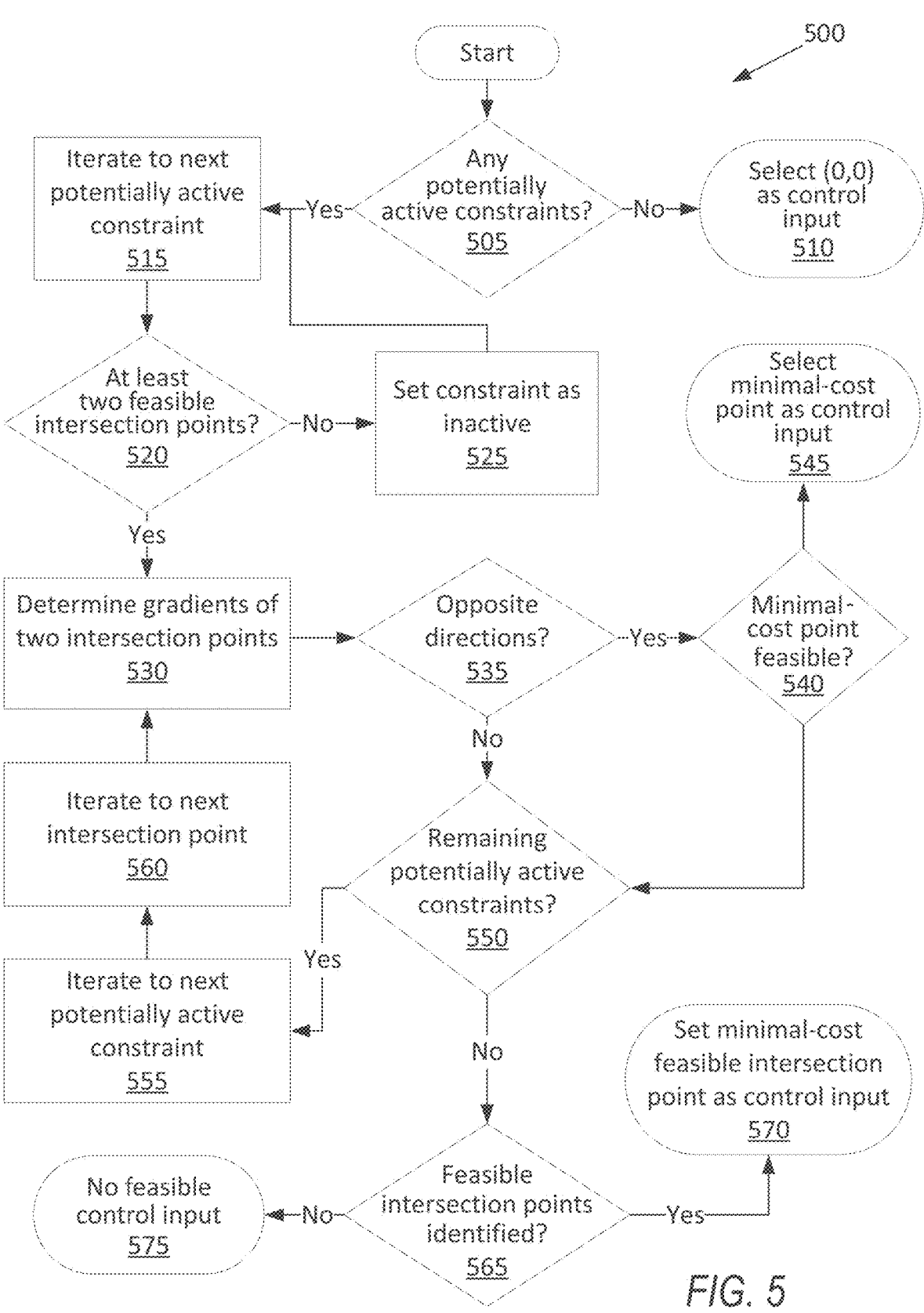
FIG. 5 is a flowchart of a first example process for determining the modification to the nominal input subject to the constraints.

FIG. 5 is a flowchart illustrating an example process 500 for determining the final input modification subject to the constraints 305, 310. The memory of the computer 105 stores executable instructions for performing the steps of the process 500 and/or programming can be implemented in structures such as mentioned above. The computer 105 may perform the process 500 after determining the constraints 305, 310, e.g., as part of the block 430 in the process 400 above. As a general overview of the process 500, the computer 105 determines whether any of the first constraints 305 are constraining on the final input modification. If not, the computer 105 selects zero as the final change to the nominal acceleration and zero as the final change to the nominal steering angle. If so, the computer 105 selects a constraining first constraint 305 with at least two intersection points 315 that are feasible. Starting with that first constraint 305, the computer 105 iterates through the constraining first constraints 305. For each first constraint 305 with intersection points 315 having gradients in opposite directions, the computer 105 determines whether the minimal-cost point 320 on that first constraint 305 is feasible and, if so, sets that minimal-cost point 320 as the final input modification. If no such minimal-cost points 320 are feasible or no first constraint 305 has intersection points 315 with opposite gradients, the computer 105 sets the feasible intersection point 315 having the lowest cost as the final input modification.

The process 500 begins in a block 505, in which the computer 105 determines whether any of the first constraints 305 are constraining on the final input modification, as described above. In response to none of the first constraints 305 constraining the final input modification, the process 500 proceeds to a terminal block 510. In response to at least one of the first constraints 305 constraining the final input modification, the process 500 proceeds to a block 515.

In the terminal block 510, the computer 105 selects zero as the final change to the nominal acceleration and zero as the final change to the nominal steering angle, i.e., $\Delta u = [0, 0]^T$. The process 500 then ends.

In the block 515, the computer 105 selects a next of the constraining first constraints 305 as a first constraint 305 of interest to evaluate in the following blocks. The computer 105 may assign index values to the first constraints 305 and proceed through in ascending order starting with the lowest index value.

Next, in a decision block 520, the computer 105 determines whether the first constraint 305 of interest has at least two intersection points 315, i.e., intersects at least two other first constraints 305. In response to the first constraint 305 of interest having one or zero intersection points 315, the process 500 proceeds to a block 525. In response to the first constraint 305 of interest having at least two intersection points 315, the process 500 proceeds to a block 530.

In the block 525, the computer 105 excludes the first constraint 305 of interest from the set of constraining first constraints 305. After the block 525, the process 500 returns to the block 515 to evaluate the next first constraint 305.

In the block 530, the computer 105 determines the gradients at two of the intersection points 315 on the first constraint 305 of interest, as described above. The computer 105 adds the two intersection points 315 to a set of intersection points 315 to evaluate.

Next, in a decision block 535, the computer 105 determines whether the gradients are oriented in opposite directions along the first constraint 305. In response to the gradients pointing in opposite directions along the first constraint 305, the process 500 proceeds to a decision block 540. In response to the gradients pointing in the same direction along the first constraint 305, the process 500 proceeds to a decision block 550.

In the decision block 540, the computer 105 determines whether the minimal-cost point 320 on the first constraint 305 of interest is feasible, as described above. In response to the minimal-cost point 320 being feasible, the process 500 proceeds to a terminal block 545. In response to the minimal-cost point 320 being infeasible, the process 500 proceeds to the decision block 550.

In the terminal block 545, the computer 105 selects the minimal-cost point 320 on the first constraint 305 of interest as the final input modification. The process 500 then ends.

In the decision block 550, the computer 105 determines whether any of the constraining first constraints 305 have not been evaluated yet. The computer 105 may determine whether the first constraint 305 of interest has the highest index value. In response to at least one first constraint 305 remaining to be evaluated, the process 500 proceeds to a block 555. In response to all the first constraints 305 being evaluated, the process 500 proceeds to a decision block 565.

In the block 555, the computer 105 selects a next of the constraining first constraints 305 as a first constraint 305 of interest to evaluate. The computer 105 may select one of the first constraints 305 intersecting the previous first constraint 305 of interest at one of the two intersection points 315 evaluated in the block 530 above, specifically the first constraint 305 intersecting at the intersection point 315 with the lower cost according to the cost function. The intersection point 315 with the higher cost according to the cost function is removed from the set of intersection points 315 to evaluate.

Next, in a block 560, the computer 105 selects another intersection point 315 on the new first constraint 305 of interest. The computer 105 selects an intersection point 315 that is feasible, as described above. After the block 560, the process 500 returns to the block 530 to evaluate the new intersection points 315 on the new first constraint 305 of interest.

In the decision block 565, the computer 105 identifies whether any of the intersection points 315 in the set of intersection points 315 to evaluate are feasible, as described above. In response to identifying at least one feasible intersection point 315 in the set of intersection points 315 to evaluate, the process 500 proceeds to a terminal block 570. In response to the set of intersection points 315 to evaluate lacking any feasible intersection points 315, the process 500 proceeds to a terminal block 575.

In the terminal block 570, the computer 105 selects the intersection point 315 having the lowest cost from the feasible intersection points 315 identified in the decision block 565 as the final input modification. The process 500 then ends.

In the terminal block 575, the computer 105 determines that no there is no feasible final input modification. The process 500 then ends. The computer 105 may then determine a final input modification using a different algorithm than described herein.

Figure 6:
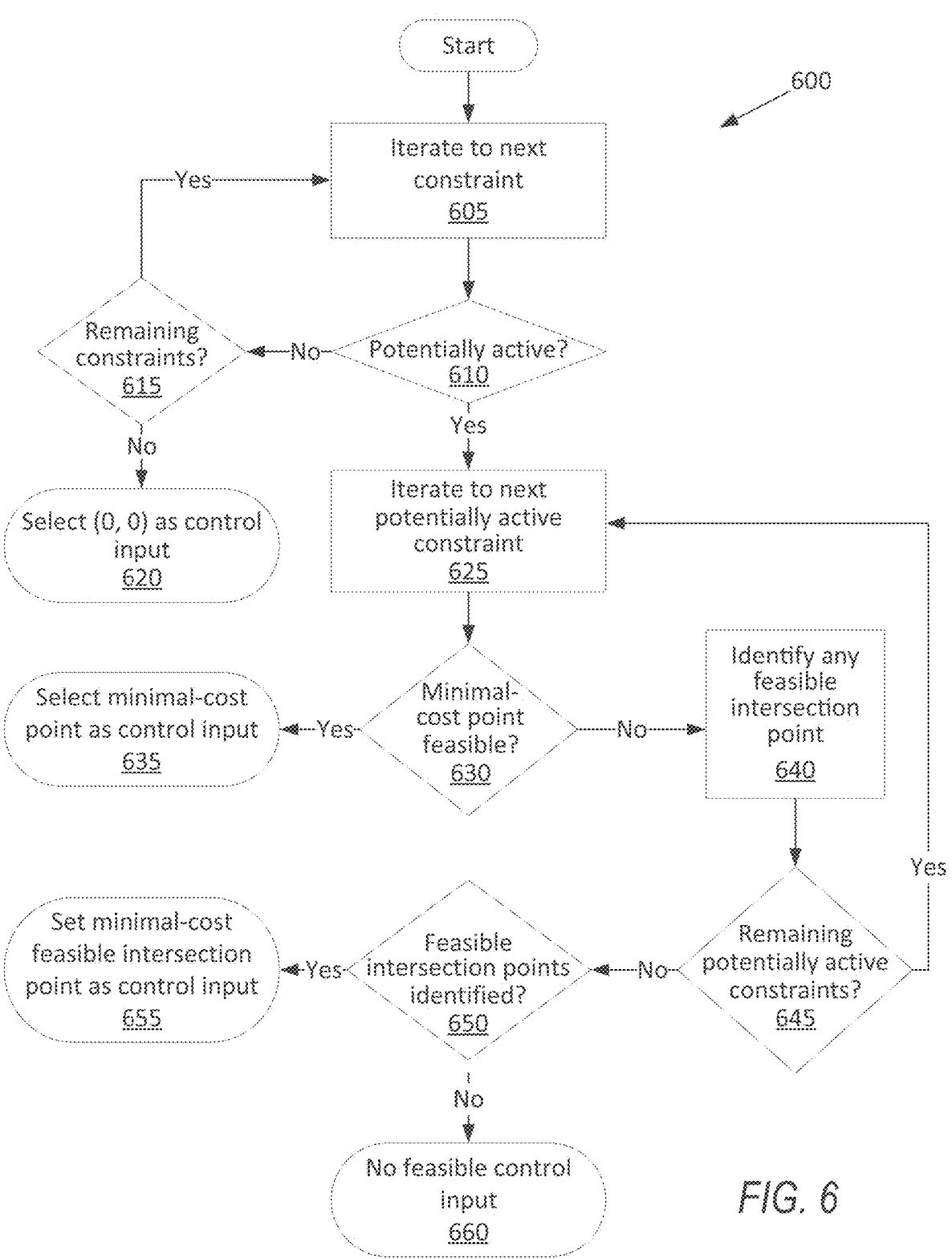
FIG. 6 is a flowchart of a second example process for determining the modification to the nominal input subject to the constraints.

FIG. 6 is a flowchart illustrating an example process 600 for determining the final input modification subject to the constraints 305, 310. The memory of the computer 105 stores executable instructions for performing the steps of the process 600 and/or programming can be implemented in structures such as mentioned above. The computer 105 may perform the process 600 after determining the constraints 305, 310, e.g., as part of the block 430 in the process 400 above. As a general overview of the process 600, the computer 105 iterates through the first constraints 305 to identify a first constraint 305 that constrains the final input modification. If none, the computer 105 selects zero as the final change to the nominal acceleration and zero as the final change to the nominal steering angle. For each constraining first constraint 305, the computer 105 selects the respective minimal-cost point 320 as the final input modification if feasible and adds the intersection points 315 for that first constraint 305 that are feasible to a set of intersection points 315 to evaluate. If none of the evaluated minimal-cost points 320 are feasible, the computer 105 sets the feasible intersection point 315 having the lowest cost from the set of intersection points 315 to evaluate as the final input modification.

The process 600 begins in a block 605, in which the computer 105 selects a next first constraint 305 from the first constraints 305 as a first constraint 305 of interest. For example, the computer 105 may assign index values to the first constraints 305 and proceed through in ascending order starting with the lowest index value.

Next, in a decision block 610, the computer 105 determines whether the first constraint 305 of interest is constraining on the final input modification, as described above. In response to the first constraint 305 of interest not constraining the final input modification, the process 600 proceeds to a decision block 615 to evaluate any remaining first constraints 305. In response to the first constraint 305 of interest being constraining on the final input modification, the process 600 proceeds to a block 625.

In the decision block 615, the computer 105 determines whether any of the first constraints 305 remain to be evaluated, e.g., whether the index value of the first constraint 305 of interest is the highest index value. In response to at least one first constraint 305 remaining to be evaluated, the process 600 returns to the block 605 to proceed to the next first constraint 305. In response to none of the first constraints 305 being constraining, the process 600 proceeds to a terminal block 620.

In the terminal block 620, the computer 105 selects zero as the final change to the nominal acceleration and zero as the final change to the nominal steering angle, i.e., $\Delta u = [0, 0]^T$. The process 600 then ends.

In the block 625, the computer 105 selects a constraining first constraint 305 to evaluate as a first constraint 305 of interest in the following blocks, e.g., using index values. The computer 105 may continue with the first constraint 305 of interest from the block 605 if proceeding from the decision block 615, and the computer 105 may proceed to a next first constraint 305 of interest if proceeding from a decision block 645 below, limited to first constraints 305 that are constraining on the final input modification.

Next, in a decision block 630, the computer 105 determines the minimal-cost point 320 on the first constraint 305 of interest, and the computer 105 determines whether that minimal-cost point 320 is feasible, as described above. In response to the minimal-cost point 320 being feasible, the process 600 proceeds to a terminal block 635. In response to the minimal-cost point 320 being infeasible, the process 600 proceeds to a block 640.

In the terminal block 635, the computer 105 selects the minimal-cost point 320 on the first constraint 305 of interest as the final input modification. The process 600 then ends.

In the block 640, the computer 105 determines whether any of the intersection points 315 on the first constraint 305 of interest are feasible, as described above, and stores the feasible intersection points 315 in a set of feasible intersection points 315 to evaluate.

Next, in a decision block 645, the computer 105 determines whether any of the constraining first constraints 305 have not been evaluated yet. The computer 105 may determine whether the first constraint 305 of interest has the highest index value, and if not, whether the first constraints 305 with higher index values constrain the final input modification. In response to at least one constraining first constraint 305 remaining to be evaluated, the process 600 returns to the block 625 to proceed to the next constraining first constraint 305. In response to all the first constraints 305 being evaluated, the process 600 proceeds to a decision block 650.

In the decision block 650, the computer 105 identifies whether any of the intersection points 315 in the set of intersection points 315 to evaluate are feasible, as described above. In response to identifying at least one feasible intersection point 315 in the set of intersection points 315 to evaluate, the process 600 proceeds to a terminal block 655. In response to the set of intersection points 315 to evaluate lacking any feasible intersection points 315, the process 600 proceeds to a terminal block 660.

In the terminal block 655, the computer 105 selects the intersection point 315 having the lowest cost from the set of feasible intersection points 315 identified in the block 640 as the final input modification. The process 600 then ends.

In the terminal block 660, the computer 105 determines that no there is no feasible final input modification. The process 600 then ends. The computer 105 may then determine a final input modification using a different algorithm than described herein.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   formulate a plurality of constraints, each constraint indicating a respective obstacle relative to a vehicle, each constraint represented as a linear inequality in a two-dimensional space with dimensions for acceleration and steering angle;
   determine a final input modification to a nominal input that minimizes a cost function subject to the constraints, the nominal input including a nominal acceleration and a nominal steering angle, the final input modification including a final change to the nominal acceleration and a final change to the nominal steering angle, by individually calculating the cost function for a plurality of potential input modifications that are on the constraints; and
   actuate a component of the vehicle according to the nominal input and the final input modification to affect motion of the vehicle.

2. The computer of claim 1, wherein the instructions further include instructions to actuate a brake system of the vehicle according to a sum of the nominal acceleration and the final change to the nominal acceleration.

3. The computer of claim 1, wherein the instructions further include instructions to actuate a steering system of the vehicle according to a sum of the nominal steering angle and the final change to the nominal steering angle.

4. The computer of claim 1, wherein the instructions further include instructions to select at least one intersection point between two of the constraints in the two-dimensional space as one of the potential input modifications for individually calculating the cost function.

5. The computer of claim 1, wherein the instructions further include instructions to select at least one minimal-cost point having a lowest value of the cost function along one of the constraints in the two-dimensional space as one of the potential input modifications for individually calculating the cost function.

6. The computer of claim 5, wherein the instructions to select the at least one minimal-cost point include instructions to solve a closed-form expression for the at least one minimal-cost point.

7. The computer of claim 1, wherein the instructions further include instructions to sequentially calculate the cost function for the potential input modifications in a rule-based order.

8. The computer of claim 1, wherein the cost function is quadratic.

9. The computer of claim 8, wherein the cost function lacks a linear term.

10. The computer of claim 1, wherein the instructions further include instructions to:
    determine that none of the constraints are constraining the final input modification; and
    upon determining that none of the constraints are constraining the final input modification, select zero as the final change to the nominal acceleration and zero as the final change to the nominal steering angle.

11. The computer of claim 1, wherein at least one of the constraints is based on a control barrier function.

12. The computer of claim 11, wherein the at least one of the constraints is equivalent to a sum of a change with respect to time of the control barrier function and a function of the control barrier function exceeding a value.

13. The computer of claim 1, wherein the cost function increases with increasing change to the nominal acceleration.

14. The computer of claim 1, wherein the cost function increases with increasing change to the nominal steering angle.

15. The computer of claim 1, wherein the constraints are first constraints, minimizing the cost function is subject to a second constraint, and the second constraint is that a sum of the nominal acceleration and the final change to the nominal acceleration is within a preset value.

16. The computer of claim 1, wherein the constraints are first constraints, minimizing the cost function is subject to a second constraint, and the second constraint is that a sum of the nominal steering angle and the final change to the nominal steering angle is within a preset value.

17. The computer of claim 1, wherein the nominal input includes at least one of a value inputted by an operator or a value outputted by an algorithm for at least partially autonomously operating the vehicle.

18. A method comprising:
    formulating a plurality of constraints, each constraint indicating a respective obstacle relative to a vehicle, each constraint represented as a linear inequality in a two-dimensional space with dimensions for acceleration and steering angle;

determining a final input modification to a nominal input that minimizes a cost function subject to the constraints, the nominal input including a nominal acceleration and a nominal steering angle, the final input modification including a final change to the nominal acceleration and a final change to the nominal steering angle, by individually calculating the cost function for a plurality of potential input modifications that are on the constraints; and actuating a component of the vehicle according to the nominal input and the final input modification to affect motion of the vehicle.

19. The method of claim 18, further comprising:

actuating a brake system of the vehicle according to a sum of the nominal acceleration and the final change to the nominal acceleration; and actuating a steering system of the vehicle according to a sum of the nominal steering angle and the final change to the nominal steering angle.

20. The method of claim 18, further comprising sequentially calculating the cost function for the potential input modifications in a rule-based order.

\* \* \* \* \*